United States Patent
Wallman

[11] Patent Number: 6,048,024
[45] Date of Patent: Apr. 11, 2000

[54] FAN DEVICE CONTAINED IN A VENTILATED VEHICLE CHAIR

[75] Inventor: Knut Olof Lennart Wallman, Linköping, Sweden

[73] Assignee: Walinov AB, Linkoping, Sweden

[21] Appl. No.: 09/043,224

[22] PCT Filed: Sep. 12, 1996

[86] PCT No.: PCT/SE96/01136

§ 371 Date: Mar. 11, 1998

§ 102(e) Date: Mar. 11, 1998

[87] PCT Pub. No.: WO97/09909

PCT Pub. Date: Mar. 20, 1997

[30] Foreign Application Priority Data

Sep. 14, 1995 [SE] Sweden ................................. 9503183

[51] Int. Cl.[7] ................................................. A47C 7/72
[52] U.S. Cl. ........................ 297/180.14; 297/452.42; 454/120
[58] Field of Search ................ 297/180.13, 180.14, 297/180.11, 452.42, 452.43; 454/120; 237/12.3 R; 417/423.1, 423.14, 423.15; 416/183, 238

[56] References Cited

U.S. PATENT DOCUMENTS

| 2,238,585 | 4/1941 | Findley | 454/120 |
|---|---|---|---|
| 2,687,684 | 8/1954 | Hunt | 454/120 |
| 2,782,834 | 2/1957 | Vigo | 297/180.14 |
| 3,782,851 | 1/1974 | Kackbarth et al. | 416/183 |
| 4,141,585 | 2/1979 | Blackman | 297/180.14 |
| 5,110,266 | 5/1992 | Toyoshima et al. | 417/423.14 |
| 5,577,888 | 11/1996 | Capdevilla et al. | 416/238 |

FOREIGN PATENT DOCUMENTS

| 0 462 517 | 12/1991 | European Pat. Off. . | |
| 2137874 | 10/1984 | United Kingdom | 297/180.14 |

*Primary Examiner*—Anthony D. Barfield
*Attorney, Agent, or Firm*—Nilles & Nilles SC

[57] ABSTRACT

A fan device which is built into a vehicle chair, and is arranged to ventilate away air that is drawn through the covering and filling of the vehicle chair, which has an electrically driven fan (9) of radial type attached at the bottom of the chair. The fan wheel (17) extends from the driving cover (14) of the motor (13), which extends up into the inlet (30) of the fan. The fan (9) is attached to a carrying means (39) in the chair which is located on the underside of the filling (40) and has passages (65) for the ventilating air adjacent to the fan inlet.

25 Claims, 5 Drawing Sheets

FAN DEVICE CONTAINED IN A VENTILATED VEHICLE CHAIR

BACKGROUND OF THE INVENTION

1. Field of the Invention

The present invention relates to a fan device contained in a ventilated vehicle chair arranged to ventilate away air that is drawn inwards through the portions of the covering and shaping filling of the vehicle chair intended to carry a vehicle driver or other person sitting in the vehicle chair, for the purpose of preventing that person from becoming too hot and sweating, the fan device comprising a fan arranged at the bottom of the chair, and having an electric motor.

2. Description of the Related Art

In recent times a number of proposals for ventilating vehicle chairs have been presented. Such a proposal, which has been published in the European patent application EP 0 462 517 A1 and which here will represent the state of the art, relates to a fan device of the kind stated above. In FIG. 1 of the application, a seat cushion 7 of porous material is shown, which is combined with a duct system having a plurality of channels 5 leading air downwards to a spacious chamber 6 which extends under the whole seat of the chair. For the ventilation, there is a suction device 8 in the form of a propeller mounted in a recess of the chamber. Under the propeller, there is a large free space at the floor.

Such a device should not be capable of performing any effective ventilation. As said figure shows, the portion of the cushion 7 located under the part of the body which is the most important to remove heat from is compressed, which causes that the corresponding part of the channel system of the cushion is obstructed. Air will therefore be drawn mainly from other portions of the covering where there is not the same need. Besides, with a knowledge of the relatively low negative pressure that characterizes propeller fans, it is strongly doubted if the propeller 8 is capable of providing such a strong suction effect in the chamber 6 that the resistance in the covering fabric and the cushion 7 is overcome and air in sufficient-amount is ventilated away. Furthermore EP 0 462 517 A1 does not reveal a fan installation which is technically feasible in modern vehicle chairs, but on the contrary, the publication shows that the inventor was unfamiliar with the problems that exist nowadays with regard to space and installation. As far as known, neither this proposal nor any other of the proposals brought forward has come to any practical use.

OBJECTS AND SUMMARY OF THE INVENTION

The object of the present invention is generally to provide a fan or blower device that can provide an effective ventilation of a vehicle chair, in which the least possible power consumption is sought. While these demands on performance are met it is also required that the fan device according to the present inventive concept has as compact a construction as possible.

In order that the demand for an effective ventilation shall be met, it is required, more precisely, that at least within the portions of the covering and cushion that carry and support the body of the person sitting in the vehicle chair, the fan device establish a considerable negative pressure at so strong a flow of air that those parts of the body—thighs, seat and back—which are in touch with the covering and where sweating otherwise mainly occurs, are kept in thermal balance by the air flowing past these parts of the body, and therefore do not get an increased temperature. This cooling effect shall be sufficient also when travelling in warm countries or when those who travel are exposed to an intense heat radiation in the passenger space of the vehicle.

Such a ventilation of the vehicle chair should be working continuously the whole time when the vehicle is running and it is therefore an important requirement that the fan device works with high efficiency and does not load the electric system of the vehicle with an unnecessarily high power consumption.

Modern vehicle chairs, particularly chairs in luxuriously equipped cars, have at the bottom systems allowing the driver or passenger to adjust the seat part and backrest of the chair so that the best and most comfortable position for driving is obtained. Such a system often comprises electric operating motors which together with the other electric components of the system, link mechanisms etc. cause the space between the underside of the seat part and the vehicle floor to be very narrow. The same applies to the space in the backrest of the vehicle chair which must not be extended backwards so as to intrude on the passenger space behind.

More precisely, the above-mentioned demand for a compact construction means that, when designing the fan device one must seek to minimize its dimensions, especially vertically, so that a fan can be installed within the extremely limited space available at the bottom of the vehicle chair. Obtaining such a compact fan construction would have been quite simple if the fan had not also to fulfill the demands which according to the above are put on an efficient ventilation, which demands do speak for a minimization of the dimensions but for a bigger, space-demanding fan device.

Providing a fan device that meets these contradictory demands is an indispensable condition according to the present inventive concept. The invention is primarily characterized in that the fan, which is of radial type, has its fan wheel extending from an exterior driving part of the motor; in that the motor extends axially upwards and, together with an upper part of the fan case forms an annular inlet opening; and in that the fan is arranged with its case to be attached to a carrying means in the chair, which is located close to the underside of the filling and, like it, has passage means for the air merging into the annular inlet opening.

Other characteristics of the fan device according to the invention are evident from the subsequent claims.

BRIEF DESCRIPTION OF THE DRAWINGS

The invention will now be described in more detail with reference to the accompanying drawing, in which.

DESCRIPTION OF THE PREFERRED EMBODIMENTS

Figure 1:
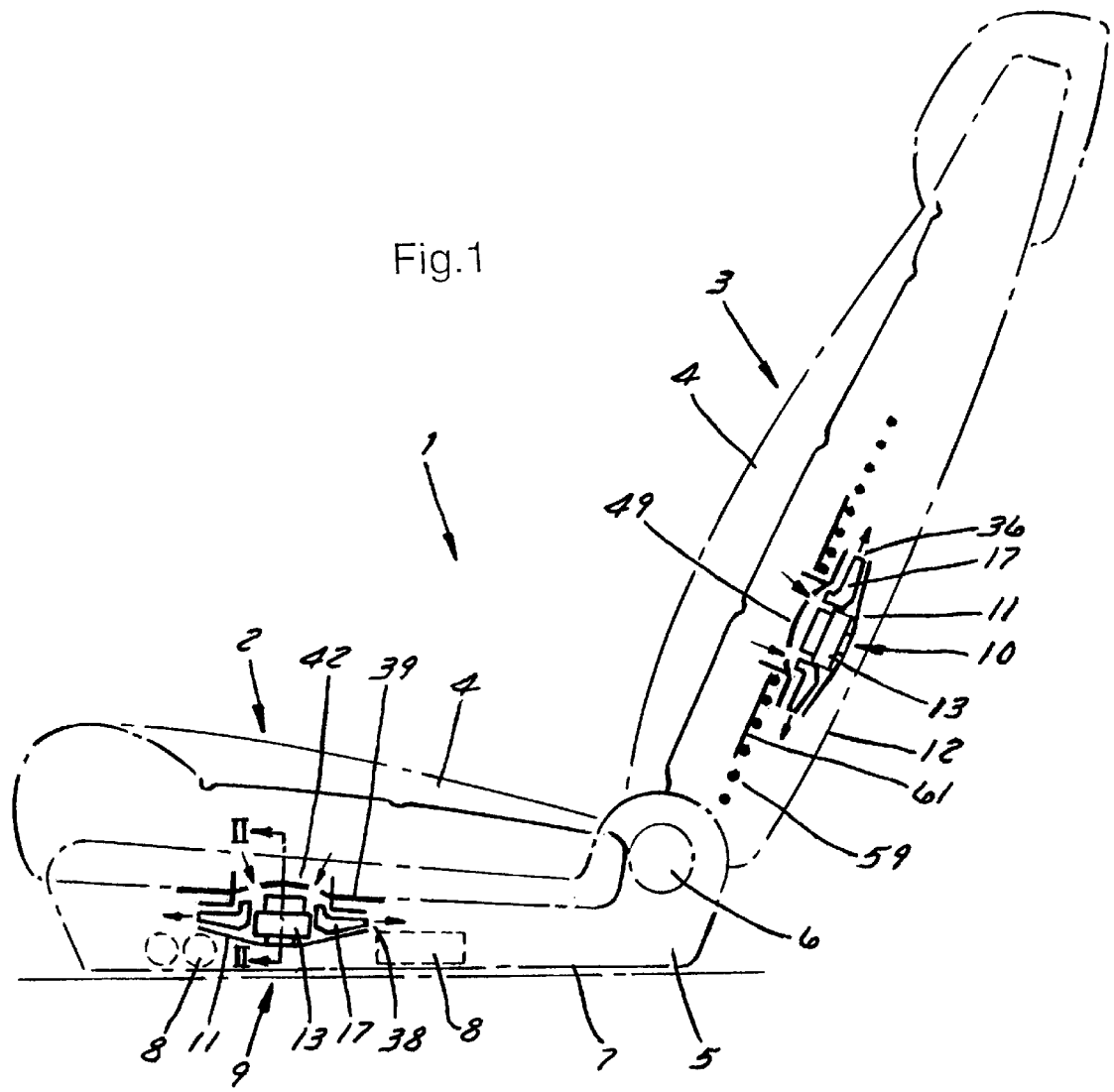
FIG. 1 is a side view of a vehicle chair, especially for cars, with fans arranged in the seat part and backrest of the chair, which are schematically shown in section.

In FIG. 1, the numeral 1 designates generally a ventilated vehicle chair, here shown as a front chair in a passenger car and comprising a seat part 2 and a backrest 3. Both have a cushion 4 that shall carry and support a vehicle driver or passenger sitting in the chair. The backrest is attached to the frame 5 of the chair in a joint 6 so that it can be set in different inclined positions.

The expression "vehicle chair" also comprehends other types of chairs and seats occurring in vehicles than the one shown here, such as back seats in cars, bus and airplane chairs, seats and couches in railway cars and passenger ships and the armchair-like chairs occurring in for example lorries and in which the seat part and backrest form a single unit. Even if the fan device according to the invention is shown and described here just for one type of vehicle chairs, the invention shall not be limited hereto but comprises applications in all other kinds of chairs or seats which shall be possible to equip with the fan device of the kind that the invention relates to in order to improve the comfort of the vehicle driver or passenger.

As is common in cars nowadays, the vehicle chair 1 may be adjustable in different ways to give to the driver or passenger a better driving position and enhanced comfort. For this end, operating means for the displacement forward or backward of the chair and for the adjustment of the seat part 2 vertically and in various angles of inclination relative to the frame 5 can be built in between the seat part 2 and the frame 5, whose limitation downwards is illustrated by the line 7. The chair can also have means to adjust the position of inclination of the backrest 3 or to give it a shape adapted to the back of the sitting person. In exclusive car models, such adjustments of the chair can be performed electrically with the aid of operating motors, symbolically shown at 8 in FIG. 1, which have their given place in the frame 5 above its lower limitation 7, but even if the manoeuvering is performed manually there is within this space a number of mechanisms with links or levers, transverse axles etc. which highly limit the possibility of equipping the chair with other space-demanding devices at the bottom.

Owing to the compact construction of the device according to the invention, which is shown in more detail below, there will however be room for fans or blowers for the ventilation of the chair also in chairs with the above-mentioned equipment. In FIG. 1 there are two fan devices, designated by 9 and 10, here shown schematically, which are installed in the seat part 2 and the backrest 3, respectively. The principal component in both devices is a fan 11 to which belong means for its attachment to the chair. The fan in the device 9 is suitably attached in the front portion of the above-mentioned space on the underside of the seat part 2, and in the symmetry plane of the chair, whereas the fan in the device 10 as the figure shows is placed in the lower portion of the backrest, where the fan is enclosed in the covering 12. It is realized that also in this portion of the chair it may be difficult to find room for a fan that provides an efficient ventilation and that one must therefore see to it that the construction of the fan is such that it does not diminish the usually small space for the legs of the back seat passengers.

With reference to FIG. 2 and FIGS. 4–7 it will now first be described how the fan in the device according to the invention can be constructed.

Here, as in the Claims, the manner of writing will be simplified so that the expressions with regard to position and direction, "at the bottom", "upper/lower", "upwards/downwards" and "from the top" a.o. which strictly apply to the fan device 9 and the seat part 2 in FIG. 1, will be used also for the fan device 10 contained in the backrest 3 according to the same figure, in that the cited expressions will be used instead of "at the rear", "front/rear", "forward/backward" and "from the front". When reading the Claims and the text relating to FIG. 4 the reader shall therefore imagine that also section IV—IV is seen vertically as if the backrest were lowered to the horizontal position.

The fan 11 contained in the device 9 and 10, respectively, is driven electrically and functions mainly as a radial fan. Its central part consists of an electric motor 13 of the known kind whose exterior part 14, the "stator part", is rotating and driving and supported on a pivot (not shown) which by means of a stationary attachment 15 is connected to the lower part 16 of the case of the fan.

By 17 is designated the blade wheel of the fan, which is composed of a lower plate 18 whose inner part forms a collar 19 encircling the motor part 14, an upper plate 20 which inwardly ends in an circular edge 21 bent in a bow-shape, and a plurality of blades 22 which by means of rivets 23 are closely connected with the two plates. The collar 19 has an inner diameter that carefully fits the jacket surface on the motor part 14 and the upper edge on the collar is bent radially inwards, so that this edge will bear against a shoulder 24 on the motor. The collar and thereby the whole blade wheel will thus be given a well-defined and centred position when the blade wheel is pressed onto the motor from above. Each part in the blade wheel will therefore rotate in a plane that is exactly perpendicular to the axis 25 of the driving motor.

In the fixed case of the fan there is a lid 26 which like the lower fixed case part 16 is extended outwards so as to form ears 27 on the lid which together with upwardly and outwardly bent lugs 28 on the case part 16 constitute attachments for the mounting of the fan in the chair. It is suitable to make three such attachments with the location evident from the plan view in FIG. 5.

The lid 26 is in its inner part formed to a downwardly bent circular nozzle 29 which with slight radial play extends down into and somewhat past the upwardly bent edge 21 of the upper wheel plate 20. Between the nozzle 29 and the motor part 14 extending axially upward past the lid 26, an annular chamber 30 is formed constituting the inlet of the fan and through which air from above shall be drawn into the blade wheel.

Figure 4:
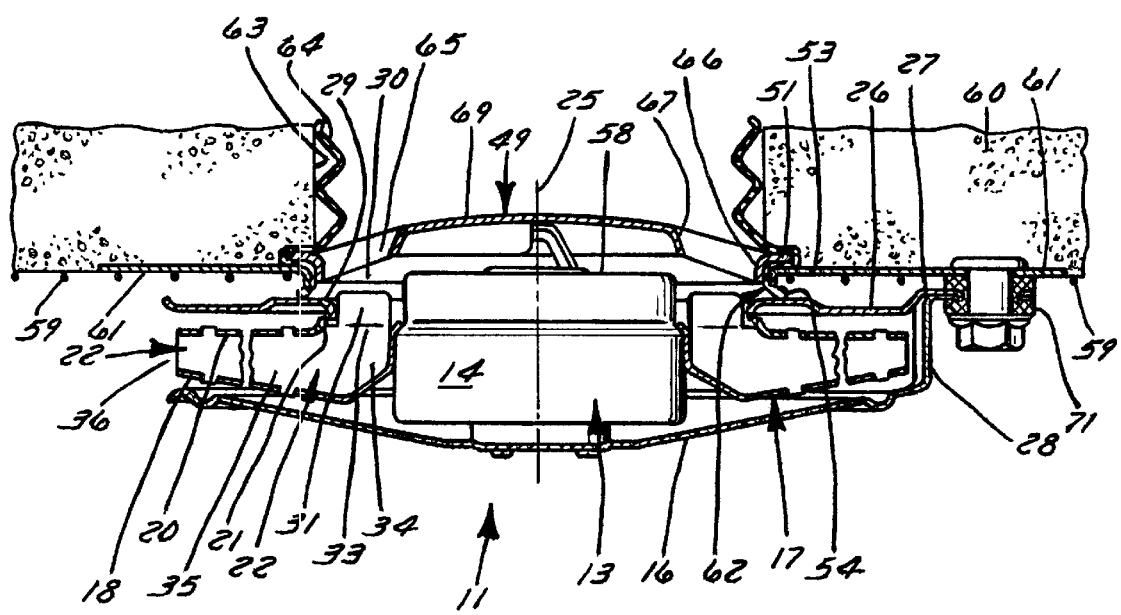
FIG. 4 is a longitudinal section of a portion-of the backrest of the vehicle chair taken in its symmetry plane in the same way as the corresponding section in FIG. 1, the position of the symmetry plane being shown by the line IV—IV in FIG. 5.
Figure 5:
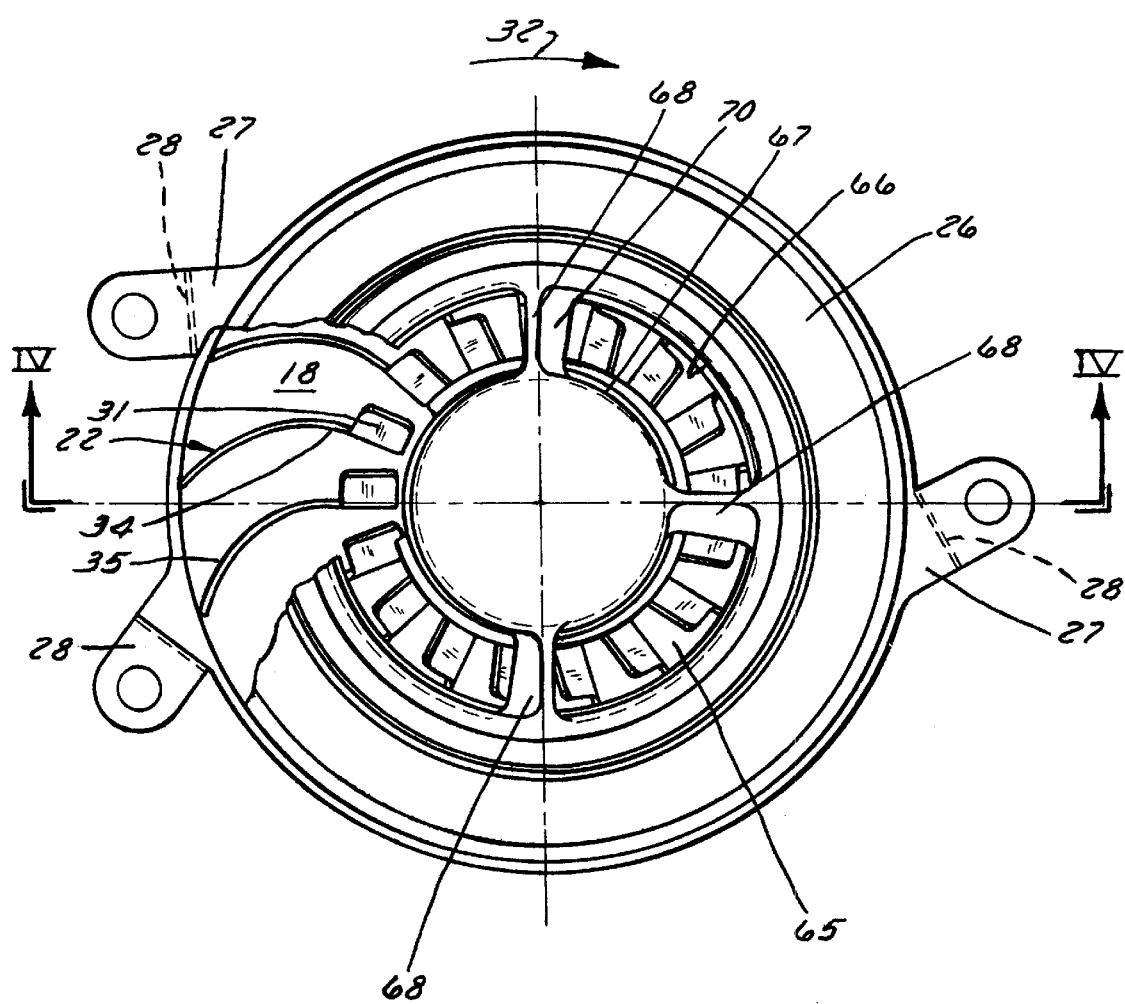
FIG. 5 is a plan view of the fan component in FIG. 4 seen from above.
Figure 6:
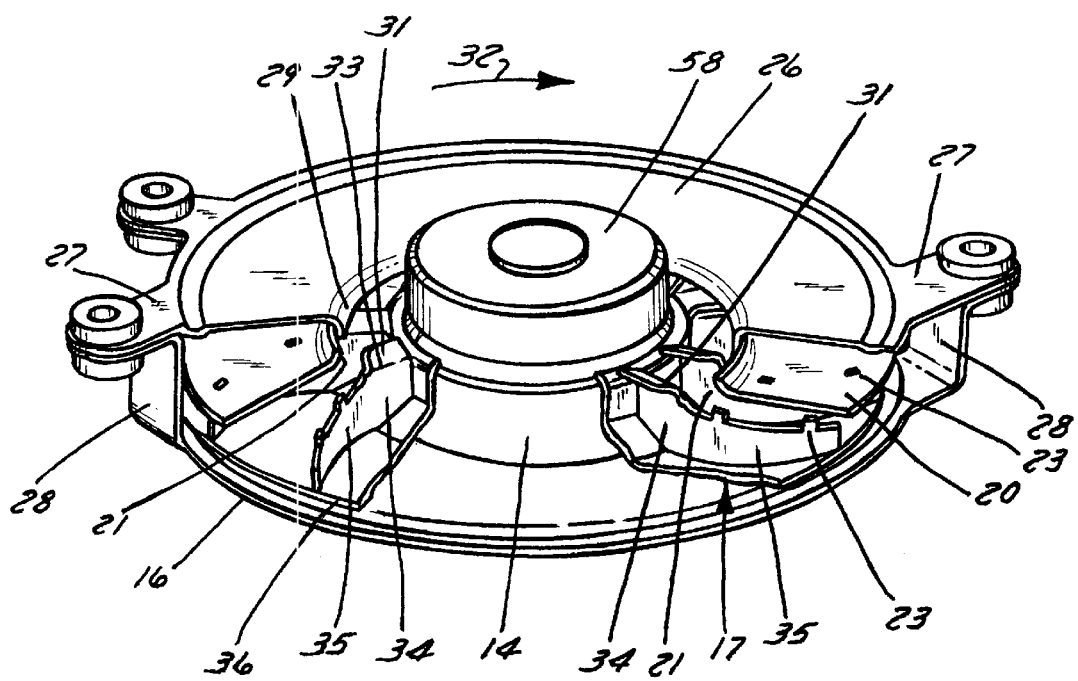
FIG. 6 is a perspective view of the fan in the device according to the invention.
Figure 7:
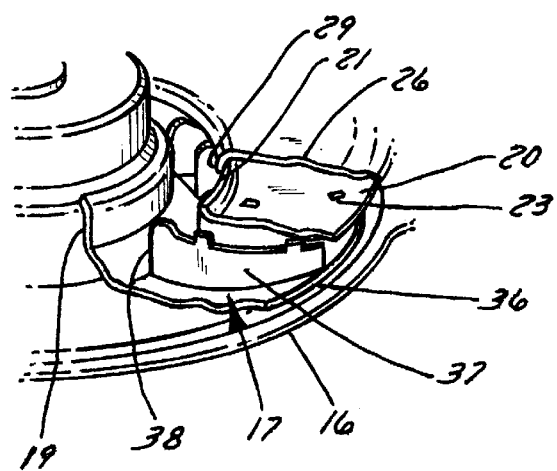
FIG. 7 shows in the same way as in FIG. 6 a portion of the fan having an alternative blade embodiment.

In order to reach the optimum effect in the fan, the blades 22 according to a characteristic of the invention can have an embodiment according to FIGS. 2–7, clearest shown by the perspective views in FIGS. 6 and 7.

Seen in the direction of flow of the air, the blades in the example of embodiment in FIG. 6 have a first portion 31 which preferably is curved or bent forward in an oblique angle, suitably 45 degrees, i.e. in the direction of rotation according to the arrow 32. This first blade portion acts in the inlet chamber 30 and, like a propeller, it drives substantially axially the air coming in therethrough. On a level with the line 33, the first blade portion 31 merges, preferably via a softly rounded passage, into a second portion 34, which should be located in a plane directed axially and at an angle to the collar 19 connected to the motor part 14. A continuation of the blade portion 34 is formed by a third portion 35 which also is directed at right angles to the wheel plates 18, 20, but extends in a bow-shape to the periphery 36 of the blade wheel, where the blade forms an angle of about 45 degrees to the wheel radius. The blade will thus become extremely backward curved, i.e. curved in the opposite direction to the direction of rotation 32.

In a preferred alternative blade construction according to FIG. 7, the blade 37 is bow-shaped in its entirety. Here, the blade does not extend all the way inwards to the collar 19 but ends just inside the upwardly bent edge 21 of the plate 20, so that between the collar and the inner blade edges 38 a free space is formed, constituting an extension downwards of the inlet chamber. In this alternative too, the blades are extremely backward curved. From the figure one would assume that a fan wheel should have a considerable number of such blades, but a rather small number, preferably about ten, has proved to be more advantageous.

A fan whose blades are constructed as just described will have a much better efficiency than ordinary radial fans, whose blades are directed radially outwards or have a slight bend backwards. The difference is of great value, making it possible for the fan device according to the invention to fulfill the demand of being power-saving, yet providing the required performance. The required performance, fulfilled by the here described fan, is a negative pressure in the order of 350 Pa at an air current of 3 to 4 l/s.

The width of the blades 22, i.e. the axial measurement, which is directly determining for the amount of the flow of air, can be slight, as shown by the testing of the fan device, compared with the wheel radius, but still the fan gives a flow of air which is sufficient for an effective ventilation of the vehicle chair. This dimensioning entails that the blade wheel 17 and the surrounding case parts 16 and 26 occupy little space vertically. In contribution hereto, the motor 13, built together with the blade wheel as described and shown here, extends up into the inlet of the fan, and with a cup-shape on the case part 16 there will be room for the bottom part of the motor with the attachment 15 within a constructional height which is small in relation to the outside diameter of the fan. The fan will hereby have a characteristic discus-like profile.

The fan is unrestrictedly blowing in the sense that its case 16, 26 is open radially around the whole periphery 36 with the exception of the lugs 28, and therefore there are no parts on the outlet side of the fan construction, apart from the lugs, that could disturb the flow of air, but the air which blows mainly radially outwards from the wheel, can flow in all directions and spread in the space available at the bottom of the seat part 2 and inside the covering 12 on the backrest 3.

In optimizing the fan construction it should also be seen to that the fan does not cause sound that disturbs the vehicle driver or passengers. For a low sound level a reduced outlet speed of the air is of great value, but careful consideration must also be given to the design of the case lugs 28. By directing the lugs as shown in FIG. 5 so that the outflowing air is not blown obliquely against any sharp edge, as in a whistle, the sound level can be lowered considerably. In an alternative embodiment of the lugs, which can be advantageous from the viewpoint of sound, the first lug portion which goes out from the case part 16 is extended so that it goes radially outwards as far as the ear 27, after which the lug has an upwardly bow-shaped portion followed by an inwardly re-bent third portion which extends horizontally and when the fan is mounted will be located parallel with and next to the ear.

Figure 2:
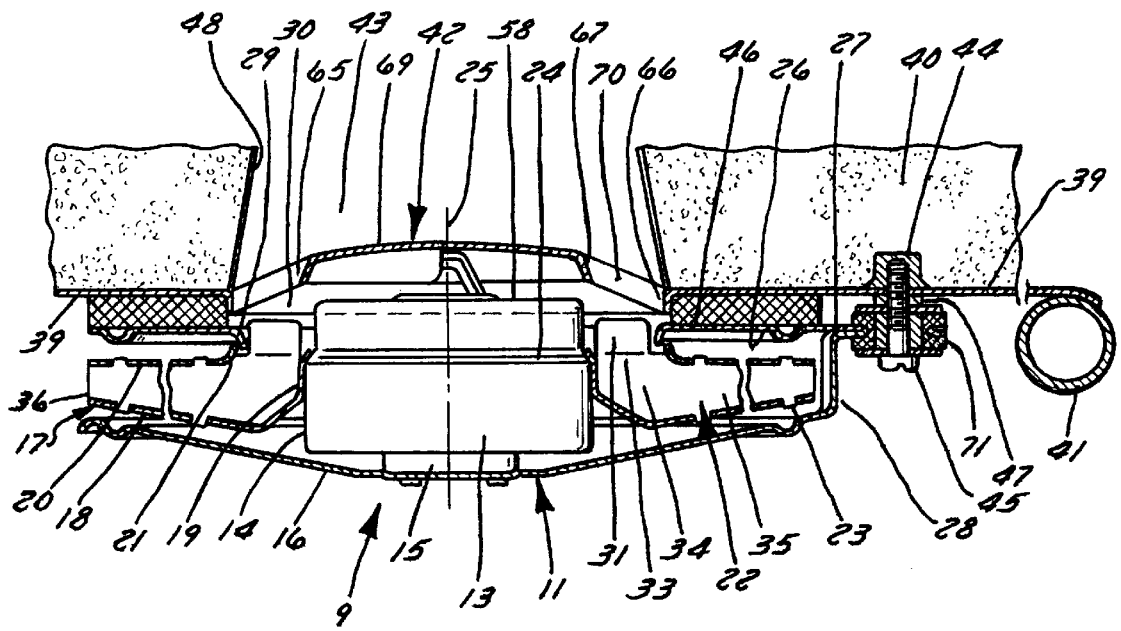
FIG. 2 is a cross-section of a portion of the seat part taken along the line II—II in FIG. 1 showing the fan device contained in the seat part.

The fan device according to the present invention can be built into a vehicle chair using different means included in the device and the chair. In one example of mounting which is shown in FIG. 2, for the attachment of the fan into the chair a transverse bottom plate 39 is used, which is located on the underside of the cushion 4 of the seat part, in FIG. 1. As is common, the cushion can have a shaping filling 40 made of moulded foamed plastic or similar material. As shown in the drawing, the underside of the filling 40 is located bearing against the bottom plate so that the plate can take up the load from the cushion 4. In its both ends the plate is welded onto tubes 41 which extend parallelly with the symmetry plane of the chair and by means of which the seat part can be hung on the frame 5 of the chair, FIG. 1.

In the place in the seat part where the fan device 9 shall be mounted, the plate 39 is curved upwards forming a protection means 42 for the fan 11. The protection means forms passages for the ventilating air that flows to the fan via one or several channels 43 extending through the filling 40. Said passages are described in more detail herebelow with reference to FIGS. 4 and 5.

In points on the bottom plate 39, which depend on the location of the attachments 27, 28 of the fan, there are holes and on the upper side of the plate there are anchor nuts 44 arranged so that the fan with the aid of screws 45 can be attached against the carrying means of the seat part, i.e. the bottom plate 39. Hereby, an elastic sealing ring 46 is applied around the inlet 30 of the fan between the fan lid 26 and the plate 39, and through spacing elements 47 applied on the screws 45 it is ensured that the sealing ring becomes somewhat compressed at the mounting of the fan, so that air cannot leak radially into the inlet 30. For the same reason the filling 40 can have a sealing layer 48 which separates the channel or channels 43 from the cushion material which to same degree can be air-permeable. Here, as in other alternatives of mounting, it is important that the fan as much as possible becomes insulated against vibrations relative to the bottom plate 39 of the chair, so that the fan does not disturb the person sitting in the chair. The ring 46 and the rubber elements 71 in which the attachments 27, 28 are hung, shall therefore have an elasticity so adapted that vibrations occurring in the fan are damped.

Figure 3:
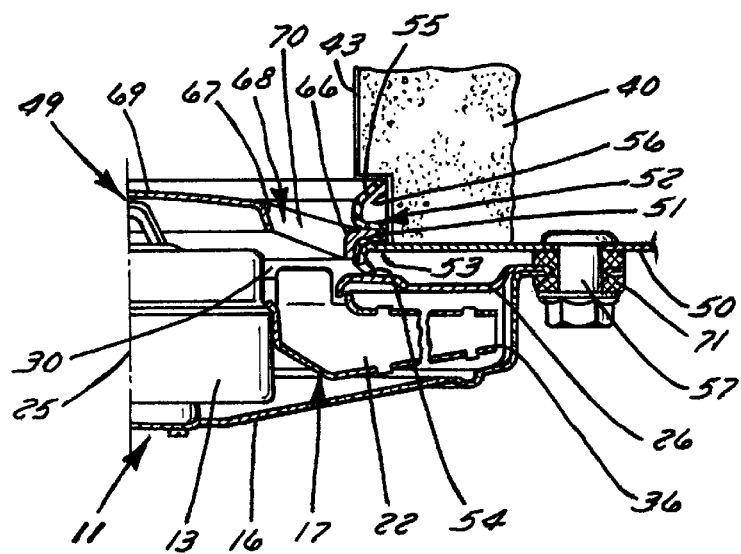
FIG. 3 shows a portion of the seat part of the fan device in an alternative embodiment, seen as the cross-section in FIG. 2.

In a second alternative of mounting, which is shown in FIG. 3, the protection means for the fan, here designated by 49, is not made in one piece with the carrying means 50, but constitutes a separate sheet-metal detail. Regarding its passage for the air, here too it is referred to the description for FIGS. 4 and 5. The detail forms a circular, radially outwardly-directed flange 51, on which a rubber ring 52 is attached, which at the mounting of the fan is pressed against an circular edge portion 53 of the carrying means, i.e. the bottom plate 50, which edge portion is parallel to the flange 51. The rubber ring 52 has two lips 54, 55, the first one directed obliquely downwards-outwards and arranged to seal against the fan lid 26 while the second lip 55 is directed obliquely upwards-outwards to fit into a circular recess 56 in the filling 40 which has its support in the carrying plate 50.

At the mounting, first the protection plate 49 and the rubber ring 52 are joined, after which they are applied against the filling 40 so that the lip 55 of the rubber ring enters the recess 56. Now, the cushion with the filling is attached in its place determined by the bottom plate 50, and with the seat part and cushion turned upside down it is ensured that the lip 54 of the rubber ring enters the fan inlet 30 and extends past the innermost part of the plate 50 which for stiffness is bent at an angle to the edge portion 53. Finally, the fan is mounted in its place and connected to the carrying means 50, in which arrangement the attachments of the fan can have shoulder bolts 57 for the fan to come into the right vertical position. Hereby, the upwardly turned end plane 58 of the motor cover 14 comes on a level with the carrying means 50, which mutual position is suitable also for other alternatives of mounting.

FIG. 4 shows one further example of embodiment of the fan device according to the invention, which can be an alternative for a seat part but which above all is intended for the installation into a backrest, as shown in FIG. 1. The fan 11 can hereby have the same construction as the one described above with reference to FIGS. 2 and 3, and therefore the same designations are used here.

In a backrest, in which the load from the person sitting in the chair is less than in the seat part, it is common-to have a so-called pullmaflex wire-netting as support for the filling of the cushion comprising metal wires spring-suspended in the frame of the backrest, so that the filling can adapt flexibly to the back of the sitting person. Such a wire-netting is designated by 59 in FIGS. 1 and 4, and on the upper side thereof a sheet-metal plate 61 is joined to the filling 60, and together with the wire-netting constitutes the carrying means in the backrest 3. The plate shall be at least so big that the fan 11 with its attachments 27, 28 can be steadily attached to the underside of the wire-netting 59, as in the FIG. 3 alternative.

As in the two earlier described alternatives of mounting the uppermost portion of the fan motor 13 will be located high up, on a level with the carrying means 39, 50 in the seat part and 59, 61 in the backrest, respectively. Such a position for the motor, which is an important characteristic of the invention, contributes considerably to the fan device obtaining the desired compact construction.

The embodiment of the central portion of the sheet-metal plate 61, and of the outer part of the protection means 49 made as a separate detail, can according to the example in FIG. 4 be the same as for the corresponding details in the FIG. 3 alternative, and in the same way as in the latter alternative, between the flange 51 and the edge portion 53 there should be a sealing means, here designated by 62, which at the mounting, according to the above-described way, will have its diagonally downwardly-directed lip 54 bearing on the fan lid 26.

The sealing means 62, which consists of rubber or similar material, in the part of it that goes upwards from the sheet-metal plate 61 through an opening 63 in the filling 60 is formed as a bellows 64, only a lower portion of which is shown in the drawing. The bellows shall guide the air that is drawn through the covering on the front of the backrest 3 and shall be so inserted into the cushion material under the covering that it prevents air from being drawn inwards to the fan from other directions as well, for example through the porous filling 60. The bellows and said insert are the objects of a separate patent application filed simultaneously herewith, entitled "A device for ventilating vehicle chairs" with priority from Swedish Patent Application No. 9503184-5.

The protection means 49 made as a separate detail, which is shown in FIGS. 3–5 and whose circular periphery forms the flange 51, has passage openings 65 which as is evident from the plan view in FIG. 5 are formed as sections of a circular ring, divided in four, possibly more, equally big parts. The openings, which should have a total area substantially as big as the area of the annular inlet chamber 30 of the fan, are limited by curved outer and inner edges 66 and 67, respectively, and spokes 68, which together carry the plate-formed central part 69 of the detail 49.

Each spoke in the protection means goes radially from an outer edge 66 to an inner edge 67, and the sheet-metal material, which should be steel, is bent so that the spoke gets an L-like cross-section with a side flange 70 directed forward as seen in the direction of rotation 32 obliquely downwards. The side flange makes the spokes rigid, and on the same time, as a guide vane, it acts upon the air current that comes from above so that it turns off in the direction of rotation before entering the fan wheel.

In the example of embodiment shown in FIG. 2, in which the protection means 42 is made in one piece with the carrying means 39, the protection means can have the same construction as in the just described example. In both cases it must be arranged to have a certain distance between the protection means and the fan parts located immediately thereunder, so as to ensure that at the rotation the motor part 14 or the portions 31 of the blades that are directed diagonally upwards do not hit the downwardly directed edges 67 or side flanges 70 of the protection means, which could seriously damage the fan. Said distance shall therefore be sufficiently great for it to prevent such damage from occurring, even if the protection means despite the convex shape or the rigidness of the spokes should yield downwards due to a jolt or other heavy load from above, caused for instance by the vehicle driver or passenger putting a knee against the seat part right above the point where the fan is located and the chair cushion being weakened through the channel or channels 43.

The present invention is not limited to the here described and shown examples of embodiment, but the embodiment and the installation in a vehicle chair of the fan device can be varied in many ways within the scope of the inventive concept as defined by the Claims. For example, in a vehicle chair of the armchair type, where the backrest is put together with the seat part to a unit, one single fan can be arranged for the whole unit suitably mounted on the underside of the cushion of the seat part. Hereby, in a manner known per se, the chair can be provided with a suction duct extending from the backrest via the rear portion of the seat part to the fan inlet, so that the fan receives all the air ventilating the vehicle chair.

The invention furthermore comprehends that the parts in the fan device, which in the above-described examples of embodiment are used in the installation, can freely be replaced and combined. So, for instance, the sealing ring 46, which in the example according to FIG. 2 prevents leakage between the fan case and the carrying means in the chair, is used generally for this purpose irrespective of whether the carrying means is constituted by the bottom plate 50 in FIG. 3 or by the wire-netting 59 and the sheet-metal plate 61 in FIG. 4 or by any other equivalent element.

The design of the fan can also be modified within the scope of the invention. The wheel blades need not narrow towards the periphery of the wheel, as the drawing shows, but can have a uniform width. Hereby, the upper blade edge as well as the upper wheel plate can have the same inclination relative to the plane that is perpendicular to the axis of rotation as the lower blade edge and the lower wheel plate, the curved shape on the underside of the fan and the discus-like profile typical of the fan, is maintained. The equally wide blade-shape, which gives an increased flowing area in the wheel and at its periphery, compared with the embodiment in the drawing, results in that the air is blown out from the fan wheel at a lower speed. The low speed is generally advantageous, partly with regard to the demand for a strong, ventilating flow of air and partly with regard to obtaining a low sound level.

I claim:

1. A fan device for use in a ventilated chair and arranged to ventilate away air that is drawn inwards through portions of a covering and a shaping filling of the chair, the fan device comprising:
   a fan configured to be arranged at a bottom of the chair and having an electric motor, wherein the fan is of a radial type and has a fan wheel operatively coupled to an exterior driving part of the motor; wherein the motor extends axially upwardly into the fan and, together with an upper part of a fan case, forms an annular inlet opening; and
   carrying means for supporting the fan, wherein the fan case is attachable to the carrying means, wherein the carrying means is configured to support the filling, and wherein the carrying means includes passage means for the passage of air into the fan inlet opening.

2. A fan device according to claim 1, wherein the width of wheel blades and thereby the constructional axial dimension of the fan is small relative to an outside diameter of the fan, and wherein a bottom part of the fan case is cup-shaped so that the fan narrows towards a periphery thereof with a discus-like profile.

3. A fan device according to claim 1, wherein an upwardly turned end plane of the driving of the motor is located substantially coplanar with the carrying means.

4. A fan device according to claim 1, wherein the fan has wheel blades which, in radially outer parts thereof, are backwardly curved relative to an axis of rotation of the fan and which, in radially inner parts thereof, extend at an angle relative to the driving part of the motor.

5. A fan device according to claim 1, wherein wheel blades of the fan each have a free, inner end part which extends from a bottom thereof upwards into the fan inlet opening and which are shaped at an oblique angle forward relative to an axis of rotation of the fan, whereby air that is drawn through the fan inlet opening is first driven axially downwards by the end part and is pressed radially outwards by a blade part from which the end part extends.

6. A fan device according to claim 1, wherein an upwardly curved protection device is located in a fan inlet duct formed above the motor, and wherein the protection device extends across an axis of rotation of the fan and is spaced from an upper surface of the motor.

7. A fan device according to claim 6, wherein the protection device is made in one piece with said carrying means.

8. A fan device for use in a ventilated chair and arranged to ventilate away air that is drawn inwards through portions of a covering and a shaping filling of the chair, the fan device comprising:
   a fan configured to be arranged at a bottom of the chair and having an electric motor, wherein the fan is of a radical type and has a fan wheel operatively coupled to an exterior driving part of the motor; wherein the motor extends axially upwardly into the fan and, together with an upper part of a fan case, forms an annular inlet opening; and
   carrying means for supporting the fan, wherein the fan case is attachable to the carrying means, wherein the carrying means for the passage of air into the fan inlet opening, wherein a periphery of the upper part of the case is formed with radially projecting ears and a lower part of the case is formed with lugs which are bent upwards and outwards to bear against the ears, and wherein the ears, the lugs, and elastic form attachments which are configured to hang the fan from said carrying means when the fan is mounted on the carrying means.

9. A fan device according to claim 7, wherein airflow from the fan is substantially unrestricted in such a way that air from the fan wheel can flow freely principally radially in all directions, apart from places where the upwardly bent lugs are located.

10. A fan device according to claim 6, further comprising an elastic sealing ring which is locateable between the upper part of said case and said carrying means when the fan is mounted on the carrying means, and wherein, when the fan is mounted on the carrying means with the elastic sealing ring therebetween, the elastic sealing ring extends around the inlet opening and is compressed somewhat at a mounting location of the fan so that air is prevented from leaking radially into the inlet opening.

11. A fan device according to claim 11, further comprising spacing elements which are configured to be arranged between the ears and said carrying elements when the fan is mounted on the carrying means, and wherein, when the fan is mounted on the carrying means, the elastic sealing ring is compressed to a degree determined by the spacing elements.

12. A fan device for use in a ventilated chair and arranged to ventilate away air that is drawn inwards through portions of a covering and a shaping filling of the chair, the fan device comprising:
   a fan configured to be arranged at a bottom of the chair and having an electric motor, wherein the fan is of a radial type and has a fan wheel operatively coupled to an exterior driving part of the motor; wherein the motor extends axially upwardly into the fan and, together with an upper part of a fan case, forms an annular inlet opening; and
   carrying means for supporting the fan, wherein the fan case is attachable to the carrying means, wherein the carrying means is configured to support the filling, and wherein the carrying means includes passage means for the passage of air into the fan inlet opening, wherein an upwardly curved protection device is located in a fan inlet duct formed above the motor, and wherein the protection device extends across an axis of rotation of the fan and is spaced from an upper surface of the motor, and wherein the protection device is constituted by a plate with passage openings for the air.

13. A fan device according to claim 12, wherein said passage openings are located in a radically outer part of the fan inlet duct above the annular inlet opening.

14. A ventilated chair comprising:
   (A) a cushion having a shaping filling;
   (B) a fan carrying device located in a vicinity of an underside of said cushion; and
   (C) a radial fan including
      (1) a case which has an upper part and which is mounted on said fan carrying device,
      (2) a motor which has an exterior driving part, wherein an upper part of said motor and said upper part of said case form an annular inlet opening of said fan, and
      (3) a fan wheel operatively coupled to said driving part of said motor, wherein
         a passage is formed in said cushion and in said fan carrying device and directs air through the covering and into said inlet opening of said fan.

15. A ventilated chair as defined in claim 14, wherein said upper part of said motor comprises an upwardly turned end plane of said driving part which is located substantially coplanar with said carrying device.

16. A ventilated chair as defined in claim 14, wherein said fan wheel has wheel blades having a width which is small relative to an outside structural diameter of said fan, and wherein said case has a bottom part which is cup-shaped so that said fan narrows towards a periphery thereof with a discus-like profile.

17. A ventilated chair as defined in claim 16, wherein each of said wheel blades has 1) a radially outer part which is backwardly curved relative to an axis of rotation of the fan and 2) a radially inner part which extends at an angle relative to said driving part of said motor.

18. A ventilated chair as defined in claim 16, wherein each of said wheel blades has a free inner end part which 1) extends from a bottom thereof upwards into said inlet opening of said fan, and 2) extends forwardly at an oblique angle relative to an axis of rotation of said fan, and wherein said fan is operable to draw air downwardly through said cushion such that said air is forced radially outwardly by a part of said wheel blades from which said free inner end parts extend.

19. A ventilated chair as defined in claim 14, wherein said fan further comprised elastic attachment elements, wherein said case further comprises a lower part, wherein a periphery of said upper part of said case is formed with radially projecting ears, wherein lugs project upwardly from said lower part of said case and are bent upwards and outwards to bear against said ears, and wherein said ears, said lugs, and said elastic attachment elements, in combination, form attachments via which said fan is hung from said fan carrying device.

20. A ventilated chair as defined in claim 19, wherein said fan is configured to permit air from said fan wheel to flow radially substantially without restriction in all directions apart from places in which said lugs are located.

21. A ventilated chair as defined in claim 19, wherein said fan further comprises an elastic sealing ring which extends around said inlet opening of said fan and which is compressed between said upper part of said case and said fan carrying device so as to prevent air from leaking radially into said inlet opening of said fan.

22. A ventilated chair as defined in claim 21, wherein said attachments further comprise spacing elements which are disposed between said ears and said lugs and which have a thickness which determines a degree of elastic sealing ring compression.

23. A ventilated chair as defined in claim 14, further comprising an upwardly curved protection device which overlies said fan wheel and said motor and which extends across an axis of rotation of said fan to form an inlet duct between 1) said protection device and 2) said fan wheel and said motor, and wherein said protection device is spaced sufficiently far from said motor to prevent damage to said fan in th event of a jolt to said cushion.

24. A ventilated chair as defined in claim 23, wherein said protection device comprises a plate having 1) an imperforate portion which covers an upper side of said motor and 2) passage openings which surround said imperforate portion and which overlie said inlet opening of said fan.

25. A ventilated chair as defined in claim 23, wherein said protection device is made in one piece with said fan carrying device.

* * * * *